(12) United States Patent
Schumacher

(10) Patent No.: US 12,075,526 B2
(45) Date of Patent: Aug. 27, 2024

(54) PRIORITY SERVICE OVER WIRELESS COMMUNICATION NETWORKS

(71) Applicant: T-Mobile Innovations LLC, Overland Park, KS (US)

(72) Inventor: Gregory David Schumacher, Holliston, MA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 355 days.

(21) Appl. No.: 17/545,583

(22) Filed: Dec. 8, 2021

(65) Prior Publication Data

US 2023/0179994 A1    Jun. 8, 2023

(51) Int. Cl.
*H04W 8/26* (2009.01)
*H04W 8/08* (2009.01)
*H04W 84/04* (2009.01)

(52) U.S. Cl.
CPC ............... *H04W 8/26* (2013.01); *H04W 8/08* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 8,711,721 B2* | 4/2014 | Smith | H04W 72/542 370/252 |
| 8,717,929 B2* | 5/2014 | Smith | H04W 72/56 370/252 |
| 8,774,797 B2 | 7/2014 | Tian et al. | |
| 8,934,373 B2* | 1/2015 | Smith | H04W 72/0453 370/252 |
| 8,934,439 B2* | 1/2015 | Smith | H04W 16/14 370/252 |
| 9,088,989 B2* | 7/2015 | Smith | H04W 72/53 |
| 9,185,510 B2 | 11/2015 | Nas | |
| 9,668,203 B2 | 5/2017 | Zhang et al. | |
| 9,930,536 B2* | 3/2018 | Smith | H04W 4/90 |
| 10,182,322 B2 | 1/2019 | Chai | |

(Continued)

FOREIGN PATENT DOCUMENTS

| | | |
|---|---|---|
| WO | 2014172867 A1 | 10/2014 |
| WO | 2021069057 A1 | 4/2021 |

*Primary Examiner* — Kenneth B Wells

(57) ABSTRACT

A wireless User Equipment (UE) delivers a priority communication service. In the UE, circuitry correlates a network Identifier (ID) for a wireless communication network with an instruction for the priority communication service. The circuitry identifies a user request for the priority communication service when the wireless UE is wirelessly attached to the wireless communication network. In response, the circuitry responsively identifies the instruction based on the correlation with the network ID. The circuitry exchanges network signaling with a radio based on the instruction and exchanges user data with the radio responsive to the exchange of the network signaling. The radio exchanges the network signaling and the user data with the UE circuitry and wirelessly exchanges the network signaling and the user data with the wireless communication network. The instruction may direct the circuitry to use an encoded public Uniform Resource Identifier (URI) to identify the UE to the wireless communication network.

20 Claims, 9 Drawing Sheets

(56) References Cited

U.S. PATENT DOCUMENTS

| | | | |
|---|---|---|---|
| 10,271,370 B2 * | 4/2019 | Atarius | G01S 7/4876 |
| 10,361,953 B1 * | 7/2019 | Bonn | H04L 45/74 |
| 10,484,381 B1 * | 11/2019 | Bonn | H04L 65/1016 |
| 10,609,628 B2 | 3/2020 | Andreoli-Fang et al. | |
| 11,140,117 B1 * | 10/2021 | Bonn | H04L 65/1104 |
| 11,343,793 B1 * | 5/2022 | John | H04W 76/14 |

* cited by examiner

PRIORITY SERVICE OVER WIRELESS COMMUNICATION NETWORKS

TECHNICAL BACKGROUND

Wireless communication networks provide wireless data services to wireless user devices. Exemplary wireless data services include voice-calling, machine-control, internet-access, media-streaming, and social-networking. Exemplary wireless user devices comprise phones, computers, vehicles, robots, and sensors. The wireless user devices execute user applications that use the wireless data services. For example, smartphones may execute voice-calling applications that communicate with one another over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network functions that are often clustered together into wireless network cores. The wireless network functions comprise Access and Mobility Management Functions (AMFs), Session Management Functions (SMFs), User Plane Functions (UPFs), and the like.

The wireless communication networks use Internet Protocol Multimedia Subsystem (IMS) to enable the wireless user devices to place and receive IP-based voice calls. To use IMS, the wireless user devices obtain IP addresses from their wireless communication networks and register their IP addresses and corresponding telephone numbers (or names) with IMS. To place a call, the calling wireless user device transfers a Session Initiation Protocol (SIP) message to IMS with the telephone numbers of the called wireless user device and the calling wireless user device. IMS translates the telephone number of the called wireless user device into its IP address and transfers a SIP message with the telephone number of the calling wireless user device to the IP address of the called device. If the called wireless user device accepts the call, the called user device returns a SIP message to IMS with the call acceptance. In response to the call acceptance, the IMS transfers SIP messaging to the calling and called wireless user devices to indicate the IP address of the other wireless user device. The called and calling wireless user devices then exchange voice data in IP packets using the IP addresses. Typically, each wireless communication network has its own IMS and the IMSs interact to handle voice calls between networks. When a wireless user device visits another wireless communication network and IMS, the visited network and IMS exchange signaling with the home network and IMS to serve the visiting UE with voice calling.

Wireless Priority Service (WPS) is a government program to provide government agents like first responders with high-priority voice calling—especially during emergencies that cause network congestion and blocked calls. To use WPS, the wireless user devices add WPS indicators to their SIP messaging like a special WPS calling prefix. IMS detects the WPS indicators and marks the SIP signaling for the WPS call to obtain a high IMS quality-of-service in IMS. Due to the high IMS service quality, the SIP signaling for the WPS calls should not be delayed in IMS—even during emergencies that cause network congestion and blocked calls. Not all wireless communication networks and their IMS support WPS. Some wireless communication networks even block WPS calls which they do not recognize.

Unfortunately, the use of WPS in a visited wireless communication network exposes user identity information for the calling user like their public SIP Uniform Resource Identifier (URI) or their public Telephone URI (TEL URI). Moreover, the IMS in the visited wireless communication network may block WPS calls which they do not support.

TECHNICAL OVERVIEW

A wireless User Equipment (UE) delivers a priority communication service. In the UE, circuitry correlates a network Identifier (ID) for a wireless communication network with an instruction for the priority communication service. The circuitry identifies a user request for the priority communication service when the wireless UE is wirelessly attached to the wireless communication network. In response, the circuitry responsively identifies the instruction based on the correlation with the network ID. The circuitry exchanges network signaling with a radio based on the instruction and exchanges user data with the radio responsive to the exchange of the network signaling. The radio exchanges the network signaling and the user data with the UE circuitry and wirelessly exchanges the network signaling and the user data with the wireless communication network. The instruction may direct the circuitry to use an encoded public Uniform Resource Identifier (URI) to identify the UE to the wireless communication network.

DETAILED DESCRIPTION

Figure 1:
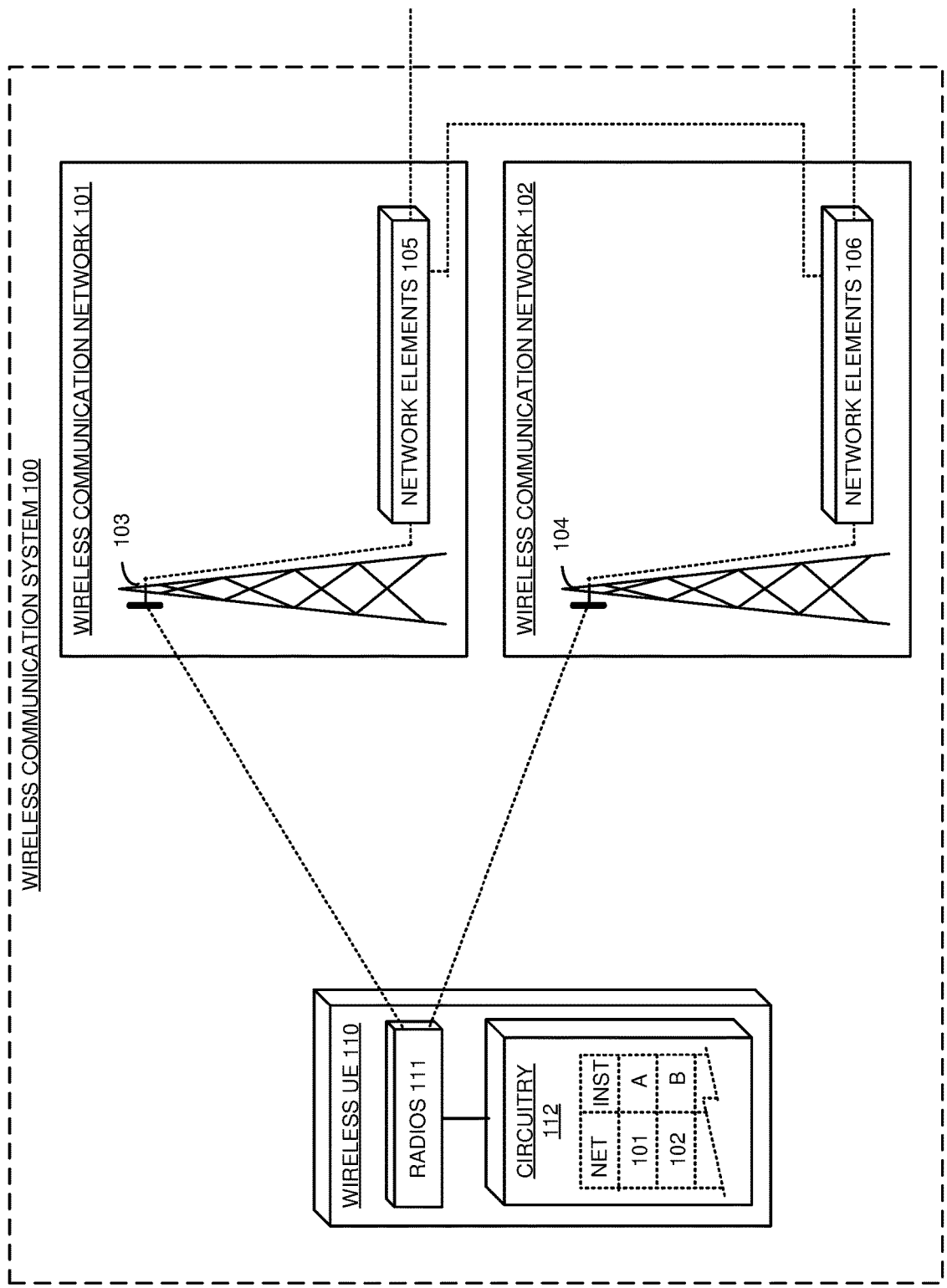
FIG. 1 illustrates an exemplary wireless communication system that comprises a wireless User Equipment (UE) and wireless communication networks to deliver a priority communication service.

FIG. 1 illustrates exemplary wireless communication system 100 that comprises wireless User Equipment (UE) 110 and wireless communication networks 101-102 to deliver a priority communication service. Wireless UE 110 comprises radios 111 and circuitry 112. Wireless communication network 101 comprises wireless access node 103 and network elements 105. Wireless communication network 102 comprises wireless access node 104 and network elements 106. Wireless UE 110 comprises a computer, phone, vehicle, sensor, robot, or some other data appliance with communication circuitry. Exemplary priority communication services include Wireless Priority Service (WPS), Virtual Private Network (VPN), and the like. Wireless communication network 100 is simplified for clarity and typically includes far more UEs, access nodes, and systems than shown.

Various examples of operation and configuration are described herein. In some examples, circuitry 112 in UE 110 correlates a network Identifier (ID) "101" for wireless communication network 101 with respective instruction "A" for using the priority communication service in network 101. Circuitry 112 correlates network ID "102" for wireless communication network 102 with respective instruction "B" for using the priority communication service in network 102. Circuitry 112 wirelessly attaches to wireless communication network 101 and receives the network ID for network 101 over one of radios 111. UE circuitry 112 identifies a user request for the priority communication service and responsively identifies instruction "A" for using the communication service based on the correlation of network ID "101" with instruction "A". In some examples, wireless communication network 101 comprises a home network for UE 110 and instruction "A" directs UE 110 to use the priority communication service in a normal mode. Circuitry 112 exchanges network signaling with wireless communication network 101 over radios 111 based on instruction "A". Circuitry 112 exchanges user data with wireless communication network 101 over radios 111 responsive to the exchange of the network signaling. Wireless communication network 101 processes the network signaling and exchanges the user data with external systems on a priority basis to deliver the priority communication service.

Subsequently, wireless UE 110 wirelessly attaches to wireless communication network 102 and receives the network ID for network 102. Circuitry 112 identifies another user request for the priority communication service and responsively identifies instruction "B" based on the correlation of network ID "102" with instruction "B". In some examples, wireless communication network 102 comprises a visited network for UE 110 and instruction "B" directs UE 110 to use the priority communication service in an anonymous mode in the visited network. Circuitry 112 exchanges network signaling with wireless communication network 102 over radios 111 based on instruction "B". For example, circuitry 112 may use anonymous user identity information in response to instruction "B". Circuitry 112 exchanges user data with wireless communication network 102 over radios 111 responsive to the exchange of the network signaling. Wireless communication network 102 processes the network signaling and exchanges the user data with external systems to deliver the priority communication service or to deliver a standard communication service depending on the network capabilities.

In some examples, wireless communication network 101 comprises a home wireless communication network for UE 110 while wireless communication network 102 comprises a visited wireless communication network. The instruction for the visited wireless communication network directs circuitry 112 to use encoded user identity information with the visited wireless communication network. The encoded user identity information maintains user anonymity in the visited wireless communication network but identifies UE 110 and provides UE status and instructions to the home wireless communication network. Circuitry 112 exchanges the network signaling with the visited wireless communication network using the encoded user identity information. The visited wireless communication network transfers the encoded user identity information to the home wireless communication network. The encoded user identity information may instruct the home wireless communication network to perform a portion of the priority communication service. The visited wireless communication network should be unable to decode the encoded user identify information.

In some examples, the instruction for the visited wireless communication network directs circuitry 112 to use a standard communication service instead of the priority communication service in the visited wireless communication network and to use encoded user identity information with the visited wireless communication network. In response, circuitry 112 exchanges the network signaling with the visited wireless communication network using the encoded user identity information to receive the standard communication service. The visited wireless communication network transfers the encoded user identity information to the home wireless communication network. The encoded user identity information notifies the home wireless communication network that UE 110 will use the standard communication service instead of the priority communication service in the visited wireless communication network.

In some examples, the instruction for the visited wireless communication network directs circuitry 112 to use the priority communication service in the visited wireless communication network and to use encoded user identity information with the visited wireless communication network. In response, circuitry 112 exchanges the network signaling with the visited wireless communication network using the encoded user identity information and to receive the priority communication service. The visited wireless communication network transfers the encoded user identity information to the home wireless communication network. The encoded user identity information notifies the home wireless communication network that UE 110 will use the encoded user identity information and the priority communication service in the visited wireless communication network.

In some examples, the instruction for the visited wireless communication network directs circuitry 112 to use a secure tunnel through the visited wireless communication network to the home wireless communication network to access the priority communication service. In response, circuitry 112 exchanges the network signaling with the visited wireless communication network using the encoded user identity information to establish the secure tunnel. The visited wireless communication network transfers the encoded user identity information to the home wireless communication network. The encoded user identity information notifies the home wireless communication network that UE 110 will use a secure tunnel through the visited wireless communication network to the home wireless communication network and encoded user identity information to access the priority communication service from the home wireless communication network.

In some examples, the encoded user identity information comprises an encoded public Session Initiation Protocol Uniform Resource Identifier (SIP URI) that has the special encoded meaning. In some examples, the encoded user identity information comprises an encoded public Telephone Uniform Resource Identifier (TEL URI) that has the special encoded meaning.

Advantageously, UE 110 uses a priority communication service like WPS without exposing user identity information to visited wireless communication networks. Moreover, UE 110 overcomes the inability of wireless communication network 102 to properly support WPS.

Radio 111 and wireless access nodes 103-104 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. Wireless communication networks 101-102 communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UE 110, wireless access nodes 103-104, and network elements 105-106 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication system 100 as described herein.

Figure 2:
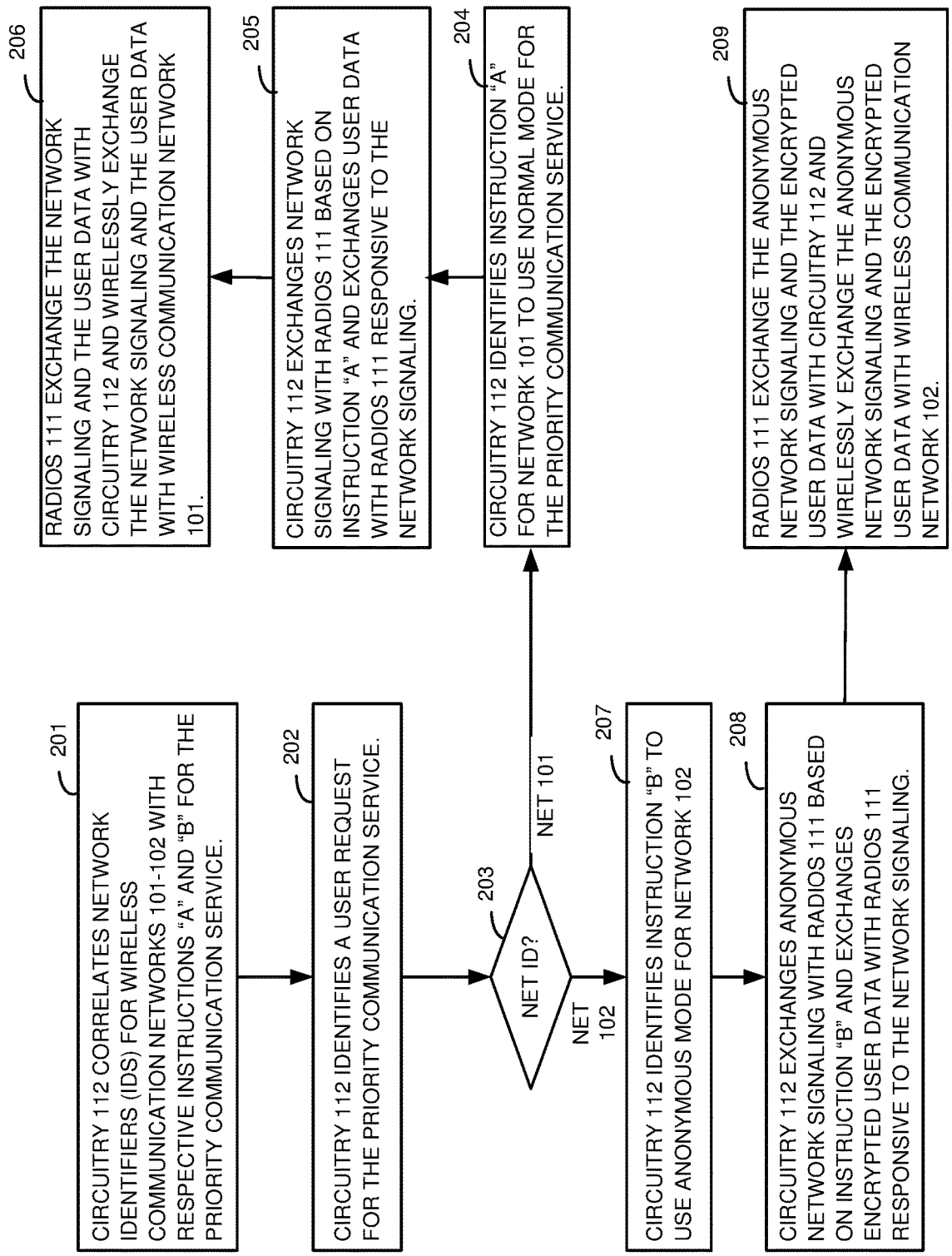
FIG. 2 illustrates an exemplary operation of the wireless communication system that comprises the wireless UE and the wireless communication networks to deliver the priority communication service.

FIG. 2 illustrates an exemplary operation of wireless communication system 100 that comprises wireless UE 110 and wireless communication networks 101-102 to deliver the priority communication service. The operation may differ in other examples. In UE 110, circuitry 112 correlates the network IDs for wireless communication networks 101-102 with respective instructions "A" and "B" for the priority communication service (201). Circuitry 112 identifies a user request for the priority communication service (202), and in response, identifies the network ID for the currently serving one of networks 101-102 (203).

When wireless communication network 101 is currently serving UE 110 (203), circuitry 112 identifies instruction "A" based on the correlation of network ID "101" with instruction "A" (204). Instruction "A" directs UE 110 to use the priority communication service in a normal mode. Circuitry 112 exchanges network signaling for the priority communication service with radios 111 based on instruction "A" (205). Circuitry 112 exchanges user data for the priority communication service with radios 111 based the network signaling. Radios 111 and wireless communication network 101 exchange the network signaling and user data for the priority communication service (206).

When wireless communication network 102 is currently serving UE 110 (203), circuitry 112 identifies instruction "B" based on the correlation of network ID "102" with instruction "B" (207). Instruction "B" directs UE 110 to use the priority communication service in an anonymous mode. In anonymous mode, user identity information is replaced with anonymous or encoded data by UE 110. UE 110 also encrypts the user data. Circuitry 112 exchanges anonymous network signaling for the priority communication service with radios 111 based on instruction "B" (208). Circuitry 112 exchanges encrypted user data for the priority communication service with radios 111 based on instruction "B" (208). Radios 111 and wireless communication network 101 exchange the anonymous network signaling and the encrypted user data for the priority communication service (209).

Figure 3:
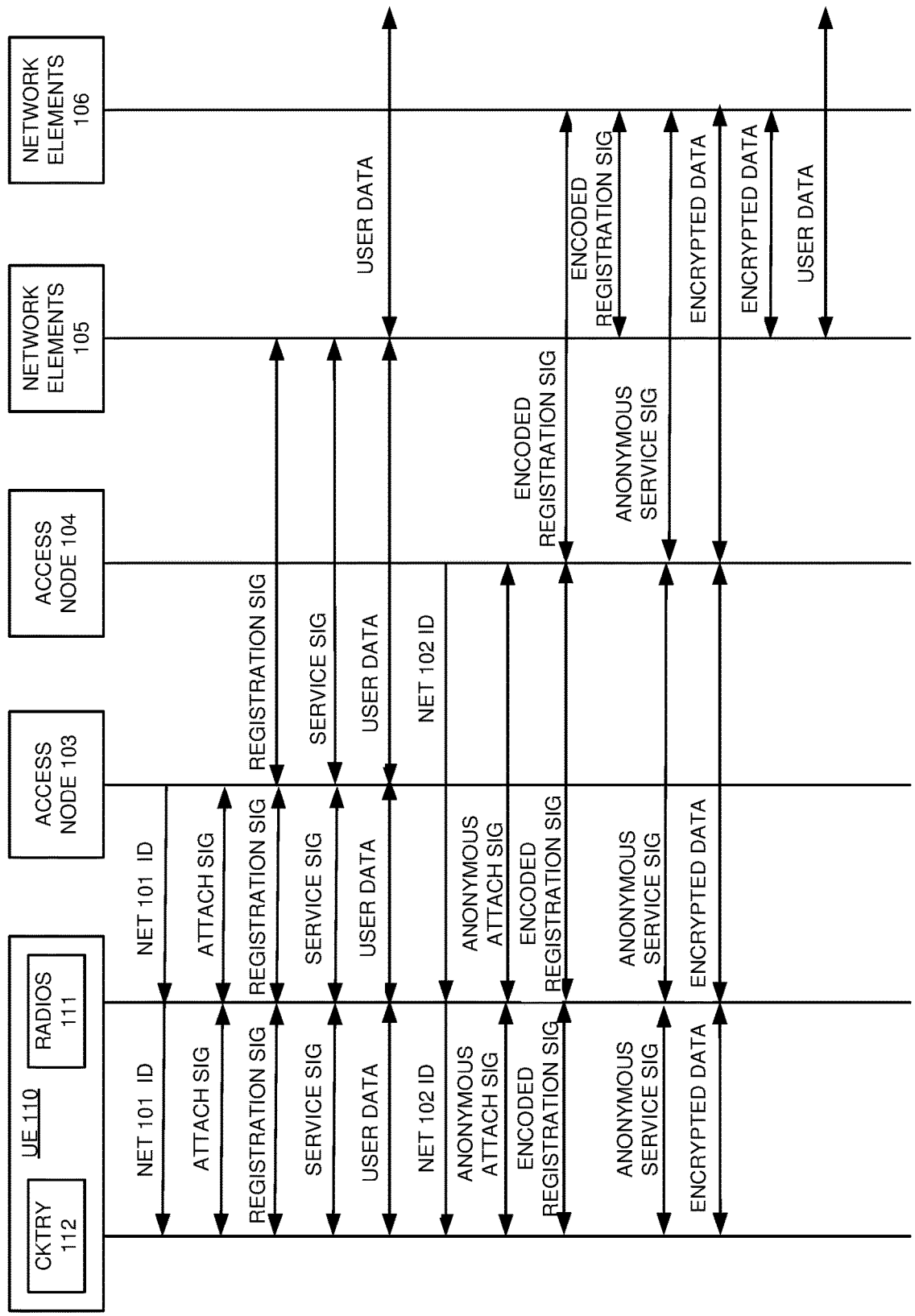
FIG. 3 illustrates an exemplary operation of the wireless communication system that comprises the wireless UE and the wireless communication networks to deliver the priority communication service.

FIG. 3 illustrates an exemplary operation of wireless communication system 100 that comprises wireless UE 110 and wireless communication networks 101-102 to deliver the priority communication service. The operation may differ in other examples. In UE 110, circuitry 112 wirelessly receives the network ID for wireless communication network 101 from wireless access node 103 over radios 111. Circuitry 112 identifies instructions for wireless communication network 101 to use a normal mode for the priority communication service. In response, circuitry 112 exchanges attachment signaling (SIG) with wireless access node 103 over radios 111. Circuitry 112 exchanges registration signaling with network elements 105 over radios 111 and wireless access node 103. To use the priority communication service based on the instruction, circuitry 112 exchanges service signaling with network elements 105 over radios 111 and wireless access node 103. Circuitry 112 exchanges user data with network elements 105 over radios 111 and wireless access node 103 responsive to the service signaling. Network elements 105 use a high quality-of-service to process the service signaling and exchange the user data to deliver the priority communication service.

Subsequently, circuitry 112 wirelessly receives the network ID for wireless communication network 102 from wireless access node 104 over radios 111. Circuitry 112 identifies instructions for wireless communication network 102 to use an anonymous mode for the priority communication service. In response, circuitry 112 exchanges anonymous attachment signaling with wireless access node 104 over radios 111. For example, circuitry 112 may use a Subscriber Private Identifier (SUPI) or use another form of an encoded International Mobile Subscriber Identifier (IMSI). Circuitry 112 exchanges encoded registration signaling with network elements 105 over radios 111, wireless access node 103, and network elements 106. The encoded registration signaling cannot be decoded by network 102 and notifies wireless communication network 101 that UE 110 will tunnel through wireless communication network 102 to obtain the priority communication service from wireless communication network 101. To use the priority communication service based on the instruction, circuitry 112 exchanges anonymous service signaling with network elements 106 over radios 111 and wireless access node 104. Circuitry 112 exchanges encrypted data with network elements 105 over radios 111, wireless access node 104, and network elements 106 responsive to the anonymous service signaling. In response to the encoded registration signaling, network elements 105 use a high quality-of-service to exchange the encrypted data and to exchange the corresponding user data to deliver the priority communication service.

Figure 4:
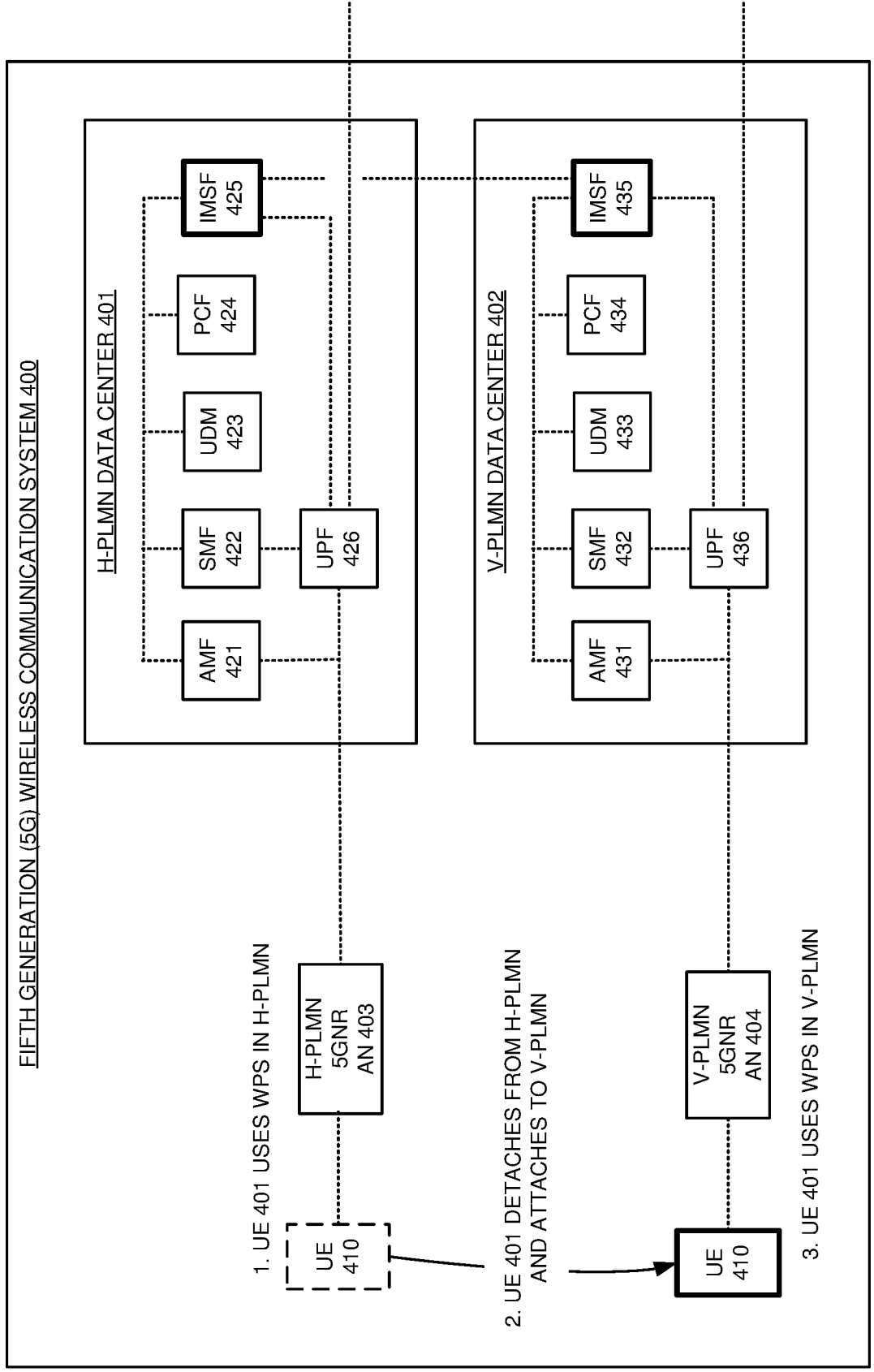
FIG. 4 illustrates an exemplary Fifth Generation (5G) wireless communication system that comprises a wireless UE, a Home Public Land Mobile Network (H-PLMN), and a Visited PLMN (V-PLMN) to deliver a Wireless Priority Service (WPS).

FIG. 4 illustrates exemplary Fifth Generation (5G) wireless communication system 400 that comprises wireless UE 410, a Home Public Land Mobile Network (PLMN), and a Visited PLMN (V-PLMN) to deliver a Wireless Priority Service (WPS). 5G wireless communication system 400 comprises an example of wireless communication system 100, although system 100 may differ. 5G wireless communication system 400 comprises: data centers 401-402, Access Nodes (ANs) 403-404, and UE 410. H-PLMN data center 401 comprises Access and Mobility Management Function (AMF) 421, Session Management Function (SMF) 422, Unified Data Management (UDM) 423, Policy Control Function (PCF) 424, Internet Protocol Multimedia Subsystem Function (IMSF) 425, and User Plane Function (UPF) 426. V-PLMN data center 402 comprises AMF 431, SMF 432, UDM 433, PCF 434, IMSF 435, and UPF 436. Wireless communication system 400 is simplified for clarity and typically includes far more UEs, ANs, data centers, and network functions than shown.

UE 410 stores a data structure in a Subscriber Identity Module (SIM) that correlates PLMN IDs to WPS instructions. In a first operation, UE 410 uses WPS in its H-PLMN which comprises H-PLMN 5GNR AN 403 and H-PLMN data center 401. In a second operation, UE 410 detaches from its H-PLMN and attaches to the V-PLMN which comprises V-PLMN 5GNR AN 404 and V-PLMN data center 402. In a third operation, UE 410 uses WPS in the V-PLMN.

To use WPS in its H-PLMN, UE 410 wirelessly receives the PLMN ID for the H-PLMN from H-PLMN 5GNR AN 403 in a System Information Block (SIB) broadcast. UE 410 attaches to H-PLMN 5GNR AN 403 and registers with AMF 421. AMF 421 interacts with UE 410 and UDM 423 to authenticate UE 410 based on a secret identity key that is stored in UE 410 and UDM 423. AMF 421 interacts with UE 410 and UDM 423 to select services/slices for UE 410 like IMS and internet-access. AMF 421 interacts with PCF 424 and SMF 422 to select context for UE 410 for the services/slices. The context comprises network addresses, data rates, priorities, and the like. SMF 422 directs UPF 426 to serve an IMS bearer to UE 410 over H-PLMN 5GNR AN 403. AMF 422 directs H-PLMN 5GNR AN 403 to serve the IMS bearer to UE 410 over UPF 426. H-PLMN 5GNR AN 403 directs UE 410 to use the IMS bearer.

UE 410 enters the data structure with the H-PLMN ID to yield IMS registration instructions. For the H-PLMN, the IMS registration is normal, so UE 410 uses its normal public Session Initiation Protocol Uniform Resource Identifier (SIP URI) and/or public Telephone Uniform Resource Identifier (TEL URI). UE 410 registers with IMSF 425 over the IMS bearer that traverses 5GNR AN 403 and UPF 426 using its normal public SIP URI and/or normal public TEL URI. To place a WPS call, UE 426 transfers a Session Initiation Protocol (SIP) invite to IMSF 425 that indicates a WPS call request by called number prefix, priority header, or some other WPS technique. IMSF 425 identifies the WPS call request and marks the SIP invite for high-quality IMS processing to deliver the priority communication service. The high-quality IMS processing makes it unlikely that the SIP invite will be delayed in high-load situation like an emergency. IMSF 425 exchanges the SIP signaling with an external SIP system to get call acceptance and to exchange IP addresses. IMSF 425 directs PCF 424 to establish a voice bearer and transfers the IP address for the called entity to UE 410. PCF 424 interacts with AMF 421 and SMF 422 to select context for UE 410 for the voice bearer. SMF 422 directs UPF 426 (or another UPF) to serve the voice bearer to UE 410 over H-PLMN 5GNR AN 403. AMF 422 directs H-PLMN 5GNR AN 403 to serve the voice bearer to UE 410 over UPF 426 (or another UPF). H-PLMN 5GNR AN 403 directs UE 410 to use the voice bearer. UE 410 and the called entity exchange voice communications over H-PLMN 5GNR AN 403 and UPF 426 using the IP addresses from IMSF 425.

To use WPS in the V-PLMN, UE 410 wirelessly receives the PLMN ID for the V-PLMN from V-PLMN 5GNR AN 404 in a SIB broadcast. UE 410 attaches to V-PLMN 5GNR AN 404 and registers with AMF 431. AMF 431 interacts with UE 410 and AMF 421 (which interacts with UDM 423) to authenticate UE 410 based on a secret identity key that is stored in UE 410 and UDM 423. AMF 431 interacts with UE 410 and AMF 421 (which interacts with UDM 423) to select services/slices for UE 410 like IMS and internet-access. AMF 431 interacts with PCF 434 and SMF 432 to select context for UE 410 for the services/slices. The context comprises network addresses, data rates, priorities, and the like. SMF 432 directs UPF 436 to serve an IMS bearer to UE 410 over V-PLMN 5GNR AN 404. AMF 431 directs V-PLMN 5GNR AN 404 to serve the IMS bearer to UE 410 over UPF 436. V-PLMN 5GNR AN 404 directs UE 410 to use the IMS bearer. UE 410 enters the data structure with the V-PLMN ID to yield IMS registration instructions. For the V-PLMN, the IMS registration uses an encoded public SIP URI and/or a public TEL URI that has a special encoded meaning to the H-PLMN. The encoded public SIP URI and/or a public TEL URI uses fake data to identify WPS UE 410 to IMSF 425 in the H-PLMN and to carry a special meaning like UE 410 will tunnel through the V-PLMN to the H-PLMN for WPS. UE 410 registers with IMSF 435 over the IMS bearer that traverses 5GNR AN 404 and UPF 436 using the encoded public SIP URI and/or encoded public TEL URI. IMSF 435 and IMSF 425 interact to register UE 410 on IMSF 435. IMSF 425 may initiate some WPS tasks responsive to the encoded public SIP URI and/or encoded public TEL URI.

The instructions for the V-PLMN may direct UE 410 to place a standard call instead of a WPS call in the V-PLMN. To place a standard call, UE 410 transfers a SIP invite to IMSF 435 that does not indicate WPS status but still uses encoded public URIs. IMSF 435 does not deliver the priority communication service to the standard SIP invite, although IMSF 435 still processes the SIP invite to set-up the voice-call. IMSF 435 exchanges SIP signaling with an external SIP system to get call acceptance and exchange IP addresses. The WPS endpoint should be configured to accept voice calls from the encoded public URI. IMSF 435 directs PCF 434 to establish a voice bearer and transfers the IP address for the called entity to UE 410. PCF 434 interacts with AMF 431 and SMF 432 to select context for UE 410 for the voice bearer. SMF 432 directs UPF 436 (or another UPF) to serve the voice bearer to UE 410 over V-PLMN 5GNR AN 404. AMF 431 directs V-PLMN 5GNR AN 404 to serve the voice bearer to UE 410 over UPF 436 (or another UPF). V-PLMN 5GNR AN 404 directs UE 410 to use the voice bearer. UE 410 and the called entity exchange voice communications over V-PLMN 5GNR AN 404 and UPF 436 using the IP addresses.

The PLMN data structure hosted by UE 410 comprises a default instruction when none of the available PLMNs match any PLMN entry in the data structure. The default instruction would typically be to not use WPS. The PLMN data structure may also use partial PLMN matches when none of the available PLMNs exactly match any PLMN entry in the data structure. The partial-match instructions could take various forms depending on what information matches and what information does not match. Wildcards could be used. For example, a PLMN entry may comprise a country code for Canada and a wildcard for the network code with instructions to use WPS. The wild card may comprise only the last digit or two of the network code with a corresponding instruction to use WPS on those specific wild-card based matches.

In addition to WPS IMS services, 5G wireless communication system 400 could deliver other WPS products like an IP data service. AMF 431 interacts with UE 410 and AMF 421 to select services/slices for UE 410 like the WPS IP data service. AMF 431 interacts with PCF 434 and SMF 432 to select context for UE 410 for the IP data service. SMF 432 directs UPF 436 to serve an IP data bearer to UE 410 over V-PLMN 5GNR AN 404. AMF 431 directs V-PLMN 5GNR AN 404 to serve the IP data bearer to UE 410 over UPF 436. V-PLMN 5GNR AN 404 directs UE 410 to use the IP data bearer. UE 410 enters the data structure with the V-PLMN ID to yield per-network instructions for WPS IP data service registration. UE 410 follows the corresponding instructions to register and use the WPS IP data service in a like manner to IMS registration.

Figure 5:
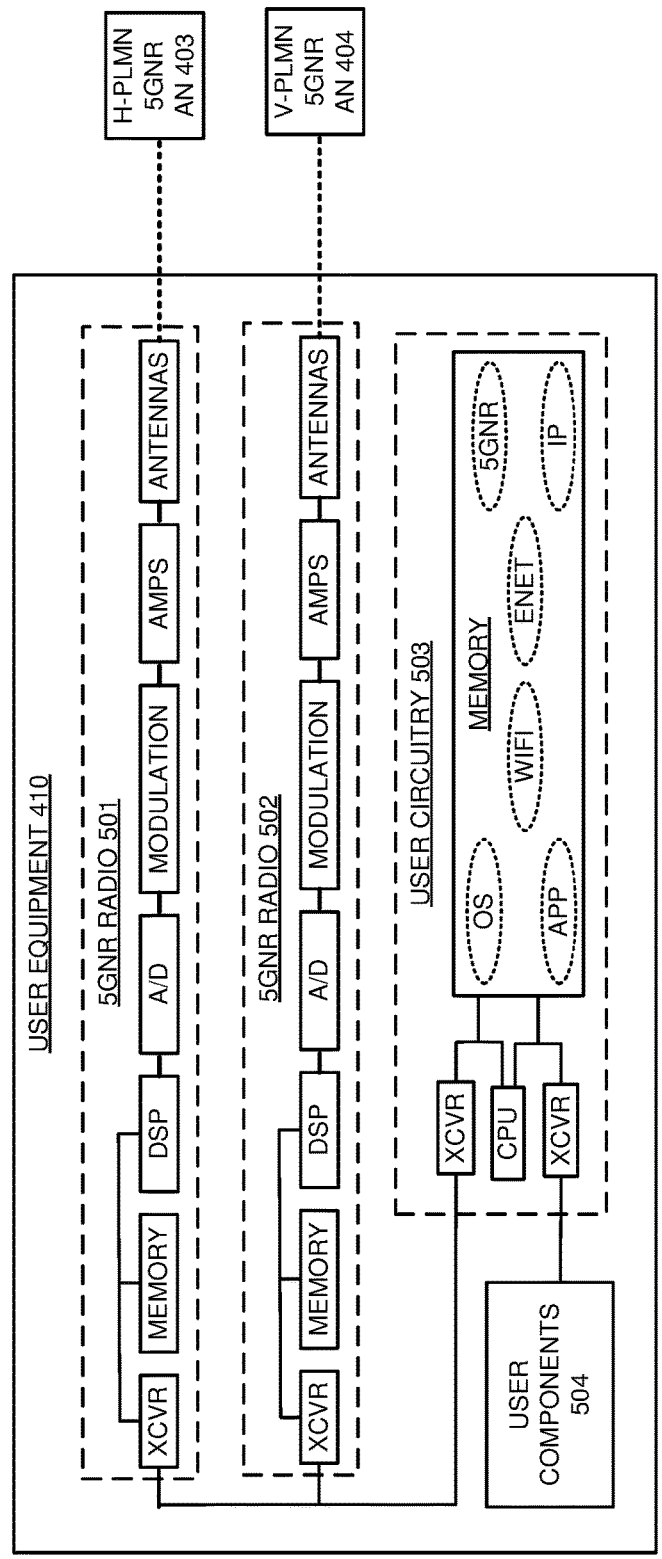
FIG. 5 illustrates an exemplary wireless UE in the 5G wireless communication system.

FIG. 5 illustrates exemplary wireless UE 410 in 5G wireless communication system 400. UE 410 comprises an example of UE 110 in system 100, although those UE 110 may differ. UE 410 comprises 5GNR radios 501-502, user circuitry 503, and user components 504. User components 504 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. User circuitry 503 comprises memory, CPU, user interfaces and components, and transceivers that are coupled over bus circuitry. The memory in user circuitry 503 stores an operating system (OS), user applications (APP), and network applications for WIFI, ENET, 5GNR, and IP. The antennas in 5GNR radio 501 are wirelessly coupled to H-PLMN 5GNR AN 403 over a 5GNR link. The antennas in 5GNR radio 502 are wirelessly coupled to V-PLMN 5GNR AN 404 over a 5GNR link. Transceivers (XCVRs) in radios 501-502 are coupled to transceivers in user circuitry 503. Transceivers in user circuitry 503 are coupled to user components 504. The CPU in user circuitry 503 executes the operating system, user applications, and network applications to exchange network signaling and user data with 5GNR ANs 403-404 over radios 501-502.

Figure 6:
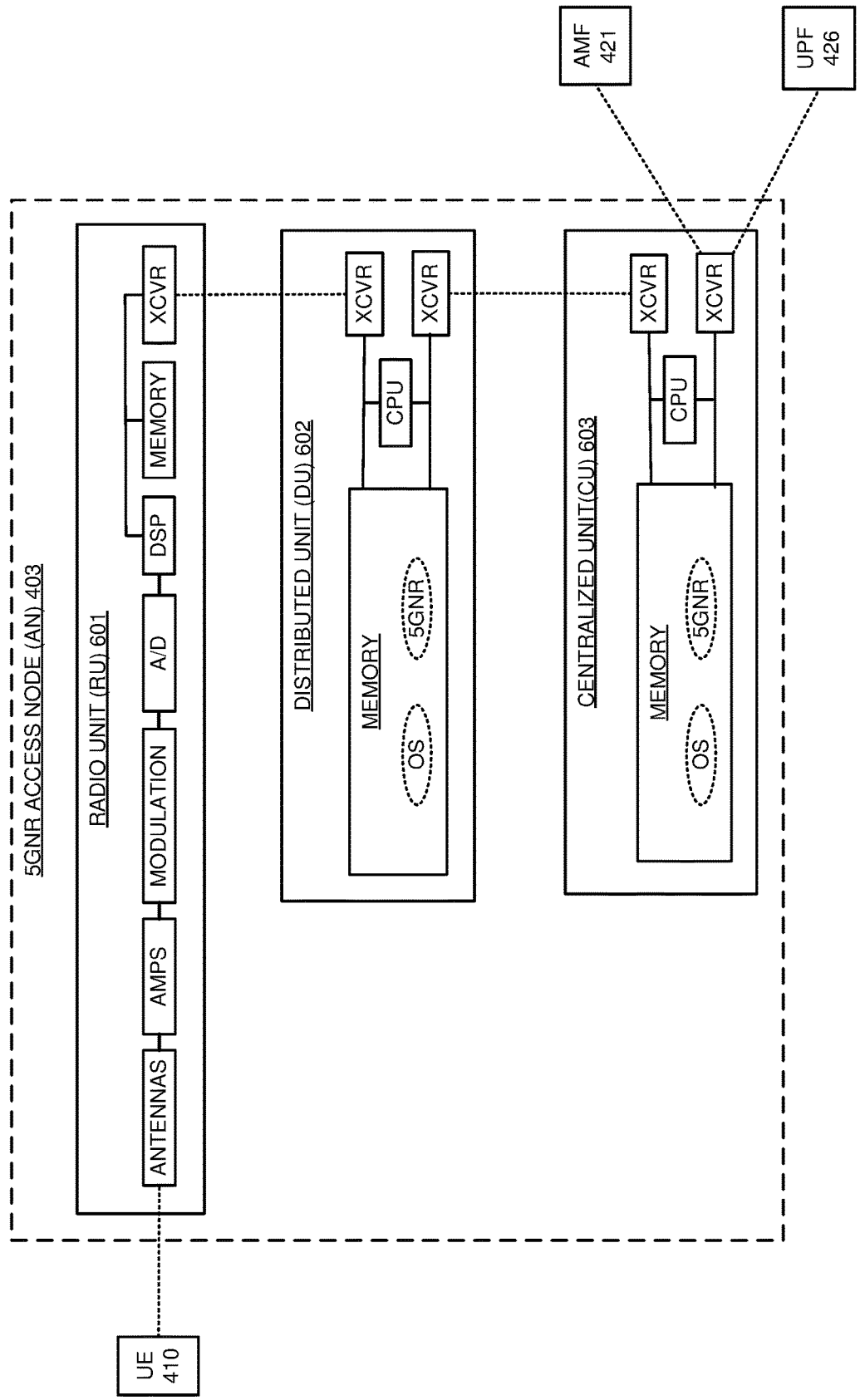
FIG. 6 illustrates an exemplary 5G New Radio (NR) access node in the 5G wireless communication system.

FIG. 6 illustrates exemplary 5GNR access node 403 in 5G wireless communication system 400. 5GNR AN 403 comprises an example of wireless access nodes 103-104 and 404, although access nodes 103-104 and 404 may differ. 5GNR AN 403 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores an operating system and 5GNR network applications (Physical Layer, Media Access Control, Radio Link Control). CU 603 comprises memory, CPU, user interfaces and components, and transceivers that are coupled over bus circuitry. The memory in CU 603 stores an operating system and 5GNR network applications (Packet Data Convergence Protocol, Service Data Adaptation Protocol, Radio Resource Control). The antennas in RU 601 are wirelessly coupled to UE 410 over a 5GNR link. Transceivers in RU 601 are coupled to transceivers in DU 602. Transceivers in DU 602 are coupled to transceivers in CU 603. Transceivers in CU 603 are coupled to AMF 421 and UPF 426. The DSP and CPU in RU 601, DU 602, and CU 603 execute operating systems, radio applications, and 5GNR applications to exchange network signaling and user data with UE 410, AMF 421, and UPF 426.

Figure 7:
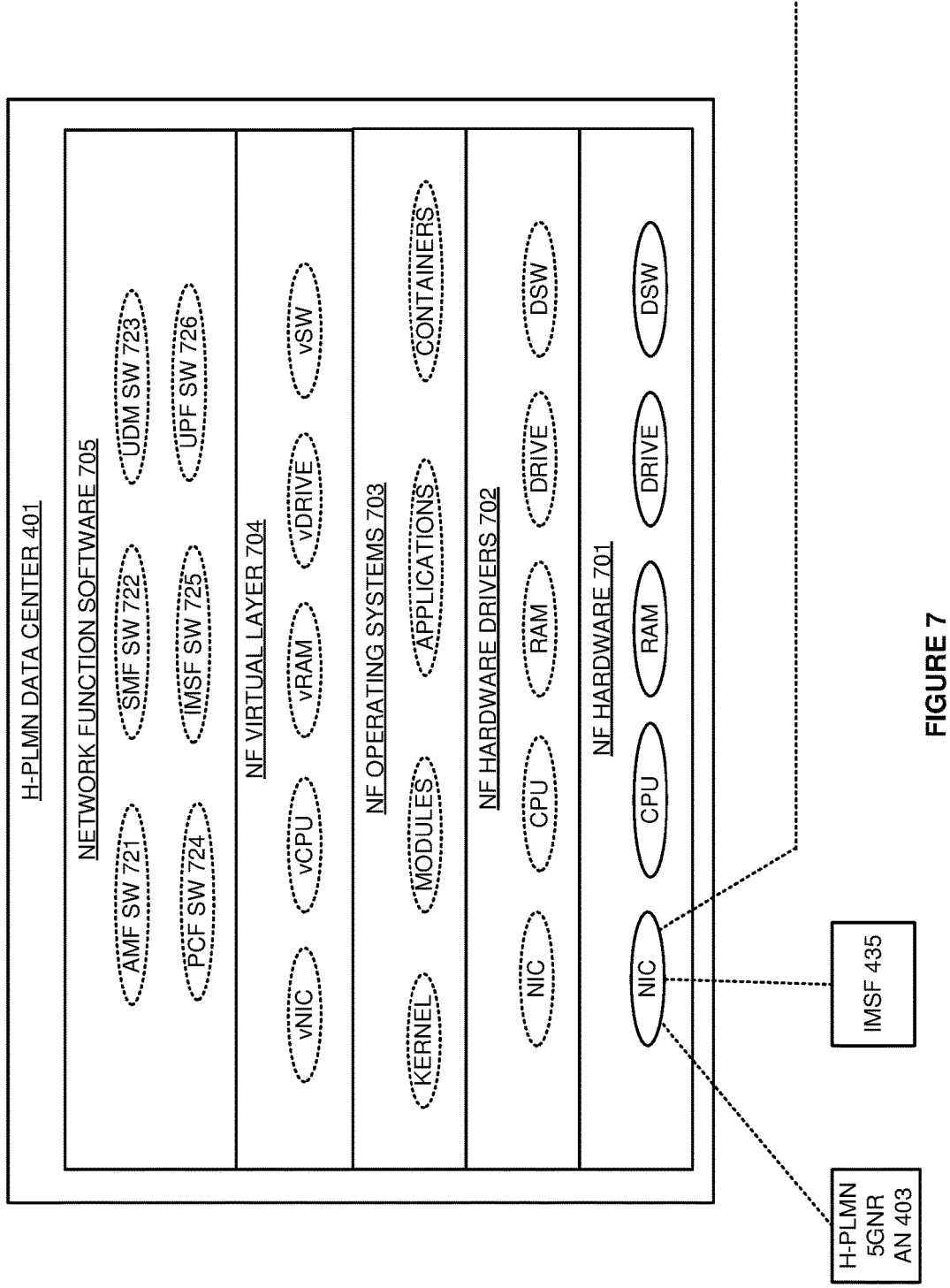
FIG. 7 illustrates an exemplary PLMN data center in the 5G wireless communication system.

FIG. 7 illustrates exemplary H-PLMN data center 401 in 5G wireless communication system 400. H-PLMN data center 401 comprises an example of network elements 105-106 and V-PLMN data center 402, although these networks and elements may differ. H-PLMN data center 401 comprises Network Function (NF) hardware 701, NF hardware drivers 702, NF operating systems 703, NF virtual layer 704, and NF Software (SW) 705. NF hardware 701 comprises Network Interface Cards (NICs), CPU, RAM, Flash/Disk Drives (DRIVE), and Data Switches (DSW). NF hardware drivers 702 comprise software that is resident in the NIC, CPU, RAM, DRIVE, and DSW. NF operating systems 703 comprise kernels, modules, and applications that form containers for virtual layer and NF software execution. NF virtual layer 704 comprises vNIC, vCPU, vRAM, vDRIVE, and vSW. NF SW 705 comprises AMF SW 721, SMF SW 722, UDM SW 723, PCF SW 724, IMSF SW 725, and UPF SW 726. Other NFs like Authentication Server Function (AUSF) and Network Exposure Function (NEF) are typically present but are omitted for clarity. H-PLMN data center 401 may be located at a single site or be distributed across multiple geographic locations. The NIC in NF hardware 701 are coupled to 5GNR AN 403, IMSF 435, and external systems. NF hardware 701 executes NF hardware drivers 702, NF operating systems 703, NF virtual layer 704, and NF SW 705 to form and operate AMF 421, SMF 422, UDM 423, PCF 424, IMSF 425, and UPF 426.

Figure 8:
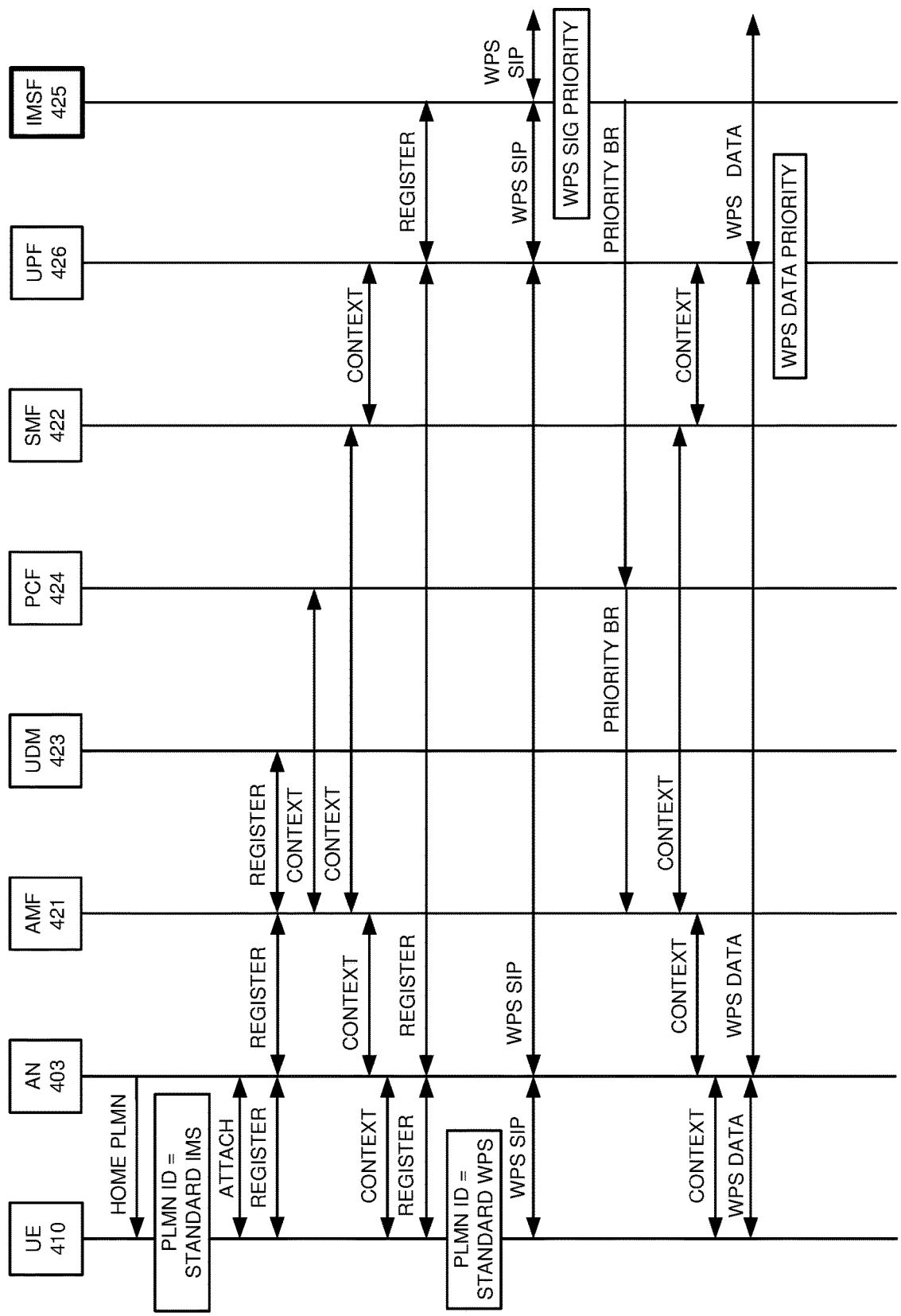
FIG. 8 illustrates an exemplary operation of the 5G wireless communication system that comprises the wireless UE and the H-PLMN to deliver the WPS.

FIG. 8 illustrates an exemplary operation of 5G wireless communication system 400 that comprises wireless UE 410 and the H-PLMN to deliver the WPS. The operation may differ in other examples. UE 410 wirelessly receives the home PLMN ID for the H-PLMN from H-PLMN 5GNR AN 403 in a SIB broadcast. UE 410 enters a data structure with the home PLMN ID which yields an instruction for standard IMS registration. UE 410 attaches to H-PLMN 5GNR AN 403. UE 410 registers with AMF 421 over H-PLMN 5GNR AN 403. AMF 421 interacts with UE 410 and UDM 423 to register UE 410 based on the secret identity key that is stored in UE 410 and UDM 423. AMF 421 interacts with UE 410 and UDM 423 to select services/slices for UE 410 like an IMS bearer. AMF 421 interacts with PCF 424 and SMF 422 to select context for UE 410 for the IMS bearer. The context comprises network addresses, data rates, latencies, priorities, and the like. SMF 422 directs UPF 426 to serve the IMS bearer to UE 410 over H-PLMN 5GNR AN 403 based on the context. AMF 422 directs H-PLMN 5GNR AN 403 to serve the IMS bearer to UE 410 over UPF 426 based on the context. H-PLMN 5GNR AN 403 directs UE 410 to use the IMS bearer context. To perform the standard IMS registration, UE uses its actual public SIP URI and/or public TEL URI. UE 410 registers with IMSF 425 over the IMS bearer that traverses H-PLMN 5GNR AN 403 and UPF 426 using its actual public SIP URI and/or normal public TEL URI. To place a WPS call, UE 410 transfers a SIP invite to IMSF 425 over AN 403 and UPF 426 that indicates the WPS call request by called number prefix, priority header, or some other technique. IMSF 425 identifies the WPS call request and marks the SIP invite for high-quality IMS processing to deliver the priority communication service. The high-quality IMS processing makes it unlikely that the SIP invite will be delayed in a high IMS load situation. IMSF 425 exchanges SIP signaling with an external SIP system to get call acceptance and exchange IP addresses. IMSF 425 directs PCF 424 to establish a priority bearer and transfers the IP address for the called entity to UE 410. PCF 424 directs AMF 421 to establish the priority bearer. AMF 421 and SMF 422 interact to select context for UE 410 for the priority bearer. SMF 422 directs UPF 426 to serve the priority bearer to UE 410 over H-PLMN 5GNR AN 403 based on the context. AMF 422 directs H-PLMN 5GNR AN 403 to serve the priority bearer to UE 410 over UPF 426 based on the context. H-PLMN 5GNR AN 403 directs UE 410 to use the voice bearer based on the context. UE 410 and the called entity exchange WPS data over H-PLMN 5GNR AN 403 and UPF 426 using the IP addresses and possibly applying a high quality-of-service to the voice packets based on the priority.

Figure 9:
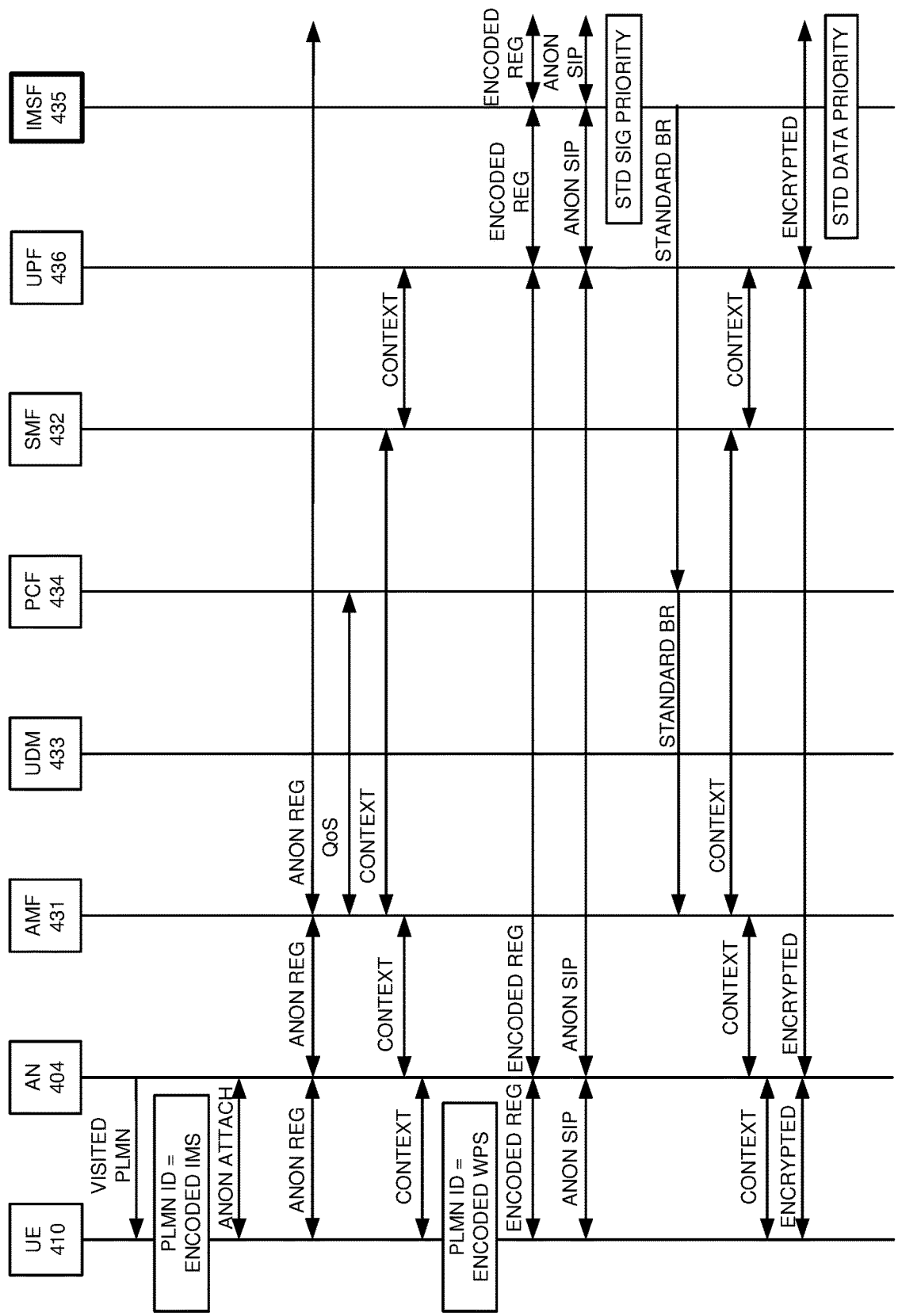
FIG. 9 illustrates an exemplary operation of the 5G wireless communication system that comprises the wireless UE, the H-PLMN, and the V-PLMN that deliver the WPS.

FIG. 9 illustrates an exemplary operation of 5G wireless communication system 400 that comprises wireless UE 410 and the V-PLMN to deliver the WPS. The operation may differ in other examples. To use WPS in the V-PLMN, UE 410 wirelessly receives the visited PLMN ID for the V-PLMN from V-PLMN 5GNR AN 404 in a SIB broadcast. UE 410 enters a data structure with the visited PLMN ID which yields an instruction for anonymous attachment and special IMS registration. UE 410 attaches to H-PLMN 5GNR AN 403 without disclosing actual user identity information like its International Mobile Subscriber Identification (IMSI). UE 410 anonymously registers with AMF 431 over V-PLMN 5GNR AN 404. AMF 431 interacts with UE 410 and AMF 421 (not shown) which interacts with UDM 423 (not shown) to register UE 410 based on a secret identity key that is stored in UE 410 and UDM 423 and to select services/slices for UE 410 like an IMS bearer. AMF 431 interacts with PCF 434 and SMF 432 to select context for UE 410 for the IMS bearer. The context comprises network addresses, data rates, latencies, priorities, and the like. SMF 432 directs UPF 436 to serve the IMS bearer to UE 410 over V-PLMN 5GNR AN 404 based on the context. AMF 432 directs V-PLMN 5GNR AN 404 to serve the IMS bearer to UE 410 over UPF 436 based on the context. V-PLMN 5GNR AN 404 directs UE 410 to use the IMS bearer context. To perform the encoded IMS registration, UE uses an encoded public SIP URI and/or public TEL URI. The encoded public SIP URI and/or public TEL URI cannot be decoded by the V-PLMN. The encoded public SIP URI and/or public TEL URI is decoded and used by the H-PLMN to support WPS for UE 410. UE 410 registers with IMSF 435 over the IMS bearer that traverses V-PLMN 5GNR AN 404 and UPF 436 using its encoded public SIP URI and/or encoded public TEL URI. The WPS instruction for the V-PLMN directs UE 410 to place a standard call instead of a WPS call. To place the standard call, UE 410 transfers a SIP invite to IMSF 435 that uses encoded public URIs but omits the WPS call request. IMSF 435 identifies the call request and exchanges SIP signaling with an external SIP system to get call acceptance and exchange IP addresses. IMSF 435 directs PCF 434 to establish a standard voice bearer and transfers the IP address for the called entity to UE 410. PCF 434 directs AMF 431 to establish the standard voice bearer. AMF 431 and SMF 432 interact to select context for UE 410 for the standard bearer. SMF 432 directs UPF 436 to serve the standard bearer to UE 410 over V-PLMN 5GNR AN 404 based on the context. AMF 432 directs V-PLMN 5GNR AN 404 to serve the standard bearer to UE 410 over UPF 436 based on the context. V-PLMN 5GNR AN 404 directs UE 410 to use the standard bearer based on the context. Per the WPS instruction, UE 410 and the called entity exchange encrypted data over V-PLMN 5GNR AN 404 and UPF 436 using the IP addresses and applying a standard quality-of-service based on the context.

The wireless data network circuitry described above comprises computer hardware and software that form special-purpose networking circuitry to deliver a priority communication service over wireless UEs and wireless communication networks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to deliver a priority communication service over wireless UEs and wireless communication networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless User Equipment (UE) to deliver a priority communication service, the method comprising:
UE circuitry correlating a network Identifier (ID) for a wireless communication network with an instruction for the priority communication service, wherein the instruction directs the UE circuitry to use encoded user identity information with the wireless communication network;

the UE circuitry identifying a user request for the priority communication service when the wireless UE is wirelessly attached to the wireless communication network and responsively identifying the instruction based on the correlation with the network ID;

the UE circuitry exchanging network signaling with a radio based on the instruction and exchanging user data with the radio responsive to the exchange of the network signaling, wherein exchanging the network signaling comprises using the encoded user identity information with the wireless communication network; and the radio exchanging the network signaling and the user data with the UE circuitry and wirelessly exchanging the network signaling and the user data with the wireless communication network.

2. The method of claim 1 wherein:

the encoded user information comprises an encoded public Session Initiation Protocol Uniform Resource Identifier (SIP URI); and the UE circuitry exchanging the network signaling and the user data comprises using the encoded public SIP URI with the wireless communication network.

3. The method of claim 1 wherein:

the encoded user information comprises an encoded public Telephony Uniform Resource Identifier (TEL URI); and the UE circuitry exchanging the network signaling and the user data comprises using the encoded public TEL URI with the wireless communication network.

4. The method of claim 1 wherein:

the wireless communication network comprises a visited wireless communication network;

the instruction directs the UE circuitry to use the encoded user identity information with the visited wireless communication network;

the UE circuitry exchanging the network signaling comprises using the encoded user identity information with the visited wireless communication network; and the visited wireless communication network transfers the encoded user identity information to a home wireless communication network for the wireless UE and the encoded user identity information directs the home wireless communication network to perform a portion of the priority communication service.

5. The method of claim 1 wherein:

the wireless communication network comprises a visited wireless communication network;

the instruction directs the UE circuitry to use a standard communication service instead of the priority communication service in the visited wireless communication network and to use the encoded user identity information with the visited wireless communication network;

the UE circuitry exchanging the network signaling comprises using the standard communication service instead of the priority communication service in the visited wireless communication network and using the encoded user identity information with the visited wireless communication network; and the visited wireless communication network transfers the encoded user identity information to a home wireless communication network for the wireless UE and the encoded user identity information notifies the home wireless communication network that the wireless UE will use the standard communication service instead of the priority communication service in the visited wireless communication network.

6. The method of claim 1 wherein:

the wireless communication network comprises a visited wireless communication network;

the instruction directs the UE circuitry to use the encoded user identity information and the priority communication service in the visited wireless communication network;

the UE circuitry exchanging the network signaling comprises using the priority communication service in the visited wireless communication network and using the encoded user identity information with the visited wireless communication network; and the visited wireless communication network transfers the encoded user identity information to a home wireless communication network for the wireless UE and the encoded user identity information notifies the home wireless communication network that the wireless UE will use the encoded user identity information and the priority communication service in the visited wireless communication network.

7. The method of claim 1 wherein:

the wireless communication network comprises a visited wireless communication network;

the instruction directs the UE circuitry to use the encoded user identity information and a secure tunnel through the visited wireless communication network to the home wireless communication network for the priority communication service in the visited wireless communication network;

the UE circuitry exchanging the network signaling comprises establishing the secure tunnel through the visited wireless communication network and using the encoded user identity information with the visited wireless communication network; and the visited wireless communication network transfers the encoded user identity information to a home wireless communication network for the wireless UE and the encoded user identity information notifies the home wireless communication network that the wireless UE will use the secure tunnel through the visited wireless communication network to the home wireless communication network to access the priority communication service.

8. The method of claim 1 wherein the priority communication service comprises a Wireless Priority Service (WPS).

9. The method of claim 1 wherein the wireless communication network comprises a Public Land Mobile Network (PLMN) and the network identifier comprises a PLMN ID.

10. A wireless User Equipment (UE) to deliver a priority communication service, the wireless UE comprising:

UE circuitry configured to correlate a network Identifier (ID) for a wireless communication network with an instruction for the priority communication service, wherein the instruction directs the UE circuitry to use encoded user identity information with the wireless communication network;

the UE circuitry configured to identify a user request for the priority communication service when the wireless UE is wirelessly attached to the wireless communication network and responsively identify the instruction based on the correlation with the network ID;

the UE circuitry configured to exchange network signaling with a radio based on the instruction and exchange user data with the radio responsive to the exchange of the network signaling, wherein the UE circuitry is configured to use the encoded user identity information to exchange the network signaling with the wireless communication network; and the radio configured to exchange the network signaling and the user data with the UE circuitry and wirelessly exchange the network signaling and the user data with the wireless communication network.

11. The wireless UE of claim 10 wherein:

the encoded user identity information comprises an encoded public Session Initiation Protocol Uniform Resource Identifier (SIP URI); and the UE circuitry is configured to use the encoded public SIP URI to exchange the network signaling and the user data with the wireless communication network.

12. The wireless UE of claim 10 wherein:

the encoded user identity information comprises an encoded public Telephony Uniform Resource Identifier (TEL URI); and the UE circuitry is configured to use the encoded public TEL URI to exchange the network signaling and the user data with the wireless communication network.

13. The wireless UE of claim 10 wherein:

the wireless communication network comprises a visited wireless communication network;

the instruction directs the UE circuitry to use the encoded user identity information with the visited wireless communication network;

the UE circuitry is configured to use the encoded user identity information to exchange the network signaling with the visited wireless communication network; and the visited wireless communication network transfers the encoded user identity information to a home wireless communication network for the wireless UE and the encoded user identity information directs the home wireless communication network to perform a portion of the priority communication service.

14. The wireless UE of claim 10 wherein:

the wireless communication network comprises a visited wireless communication network;

the instruction directs the UE circuitry to use a standard communication service instead of the priority communication service in the visited wireless communication network and to use the encoded user identity information with the visited wireless communication network;

the UE circuitry is configured to use the standard communication service instead of the priority communication service in the visited wireless communication network and use the encoded user identity information to exchange the network signaling with the visited wireless communication network; and the visited wireless communication network transfers the encoded user identity information to a home wireless communication network for the wireless UE and the encoded user identity information notifies the home wireless communication network that the wireless UE will use the standard communication service instead of the priority communication service in the visited wireless communication network.

15. The wireless UE of claim 10 wherein:

the wireless communication network comprises a visited wireless communication network;

the instruction directs the UE circuitry to use the priority communication service and the encoded user identity information with the visited wireless communication network;

the UE circuitry is configured to use the encoded user identity information and the priority communication service in the visited wireless communication network to exchange the network signaling with the visited wireless communication network; and the visited wireless communication network transfers the encoded user identity information to a home wireless communication network for the wireless UE and the encoded user identity information notifies the home wireless communication network that the wireless UE will use the encoded user identity information and the priority communication service in the visited wireless communication network.

16. The wireless UE of claim 10 wherein:

the wireless communication network comprises a visited wireless communication network;

the instruction directs the UE circuitry to use the encoded user identity information and a secure tunnel through the visited wireless communication network to the home wireless communication network for the priority communication service in the visited wireless communication network;

the UE circuitry is configured to use the encoded user identity information and establish the secure tunnel through the visited wireless communication network to exchange the network signaling with the visited wireless communication network; and the visited wireless communication network transfers the encoded user identity information to a home wireless communication network for the wireless UE and the encoded user identity information notifies the home wireless communication network that the wireless UE will use the secure tunnel through the visited wireless communication network to the home wireless communication network to access the priority communication service.

17. The wireless UE of claim 10 wherein the priority communication service comprises a Wireless Priority Service (WPS).

18. The wireless UE of claim 10 wherein the wireless communication network comprises a Public Land Mobile Network (PLMN) and the network identifier comprises a PLMN ID.

19. A method of operating a wireless user device, the method comprising:

correlating a network Identifier (ID) for a wireless communication network with an instruction for the priority communication service, wherein the instruction directs the wireless user device to use encoded user identity information with the wireless communication network;

identifying a user request for the priority communication service when the wireless user device is wirelessly attached to the wireless communication network;

responsively identifying the instruction based on the correlation with the network ID;

wirelessly exchanging network signaling with the wireless communication network using the encoded user identity information; and responsive to exchanging the network signaling, wirelessly exchanging user data with the wireless communication network.

20. The method of claim 19 wherein:

the encoded user information comprises an encoded public Session Initiation Protocol Uniform Resource Identifier (SIP URI); and wirelessly exchanging the network signaling comprises using the encoded public SIP URI with the wireless communication network.

* * * * *